United States Patent [19]

Glass et al.

[11] Patent Number: 5,478,785
[45] Date of Patent: Dec. 26, 1995

[54] INFILTRATION PROCESS FOR INTRODUCING ADDITIONAL PHASES FOR MULTIPHASE (COMPOSITE) MATERIALS

[75] Inventors: S. Jill Glass, Wilmington, Del.; David J. Green, State College, Pa.; Basil R. Marple, Halifax, Canada

[73] Assignee: Pennsylvania Research Corporation, University Park, Pa.

[21] Appl. No.: 433,039

[22] Filed: Nov. 6, 1989

[51] Int. Cl.$^6$ .................... C04B 35/01; C04B 35/10
[52] U.S. Cl. .................. 501/103; 264/62; 427/228; 427/311; 427/387
[58] Field of Search ................ 501/103; 427/227, 427/228, 387, 311; 419/2; 364/48, 43, 134, 212, 60, 66, 62

[56] References Cited

U.S. PATENT DOCUMENTS

| | | | |
|---|---|---|---|
| 2,828,225 | 3/1958 | Goetzel | 501/87 |
| 3,533,738 | 6/1970 | Rundell et al. | 23/110 |
| 4,418,024 | 11/1983 | Prochazka et al. | 264/1.2 |
| 4,418,025 | 11/1983 | Prochazka et al. | 264/1.2 |
| 4,427,785 | 1/1984 | Prochazka et al. | 501/128 |
| 4,600,481 | 7/1986 | Sane et al. | 501/98 |
| 4,657,876 | 4/1987 | Hillig | 501/87 |
| 4,725,567 | 2/1988 | Hillig | 501/87 |
| 4,737,476 | 4/1988 | Hillig | 501/87 |
| 4,774,068 | 9/1988 | Hiraiwa et al. | 423/327 |
| 5,009,822 | 4/1991 | Sacks et al. | 264/23 |
| 5,021,367 | 6/1991 | Singh et al. | 501/88 |
| 5,135,691 | 8/1992 | Hama et al. | 264/60 |

*Primary Examiner*—Ngoclan Mai
*Attorney, Agent, or Firm*—Yahwak & Associates

[57] ABSTRACT

A method for producing composite materials by introducing additional phases into a porous body wherein a liquid precursor is infiltrated into the porous body, the liquid is decomposed to produce a desired phase, the body is fired for further densification, and the decomposed liquid is allowed to remain as an additional phase or reacts with the porous body to form an additional phase is disclosed. This allows for a novel method of introducing the additional phase, and by controlling the parameters such as infiltration time, firing schedule, porous body density, etc., the size, amount, extent and distribution of the added phases may be controlled.

19 Claims, 1 Drawing Sheet

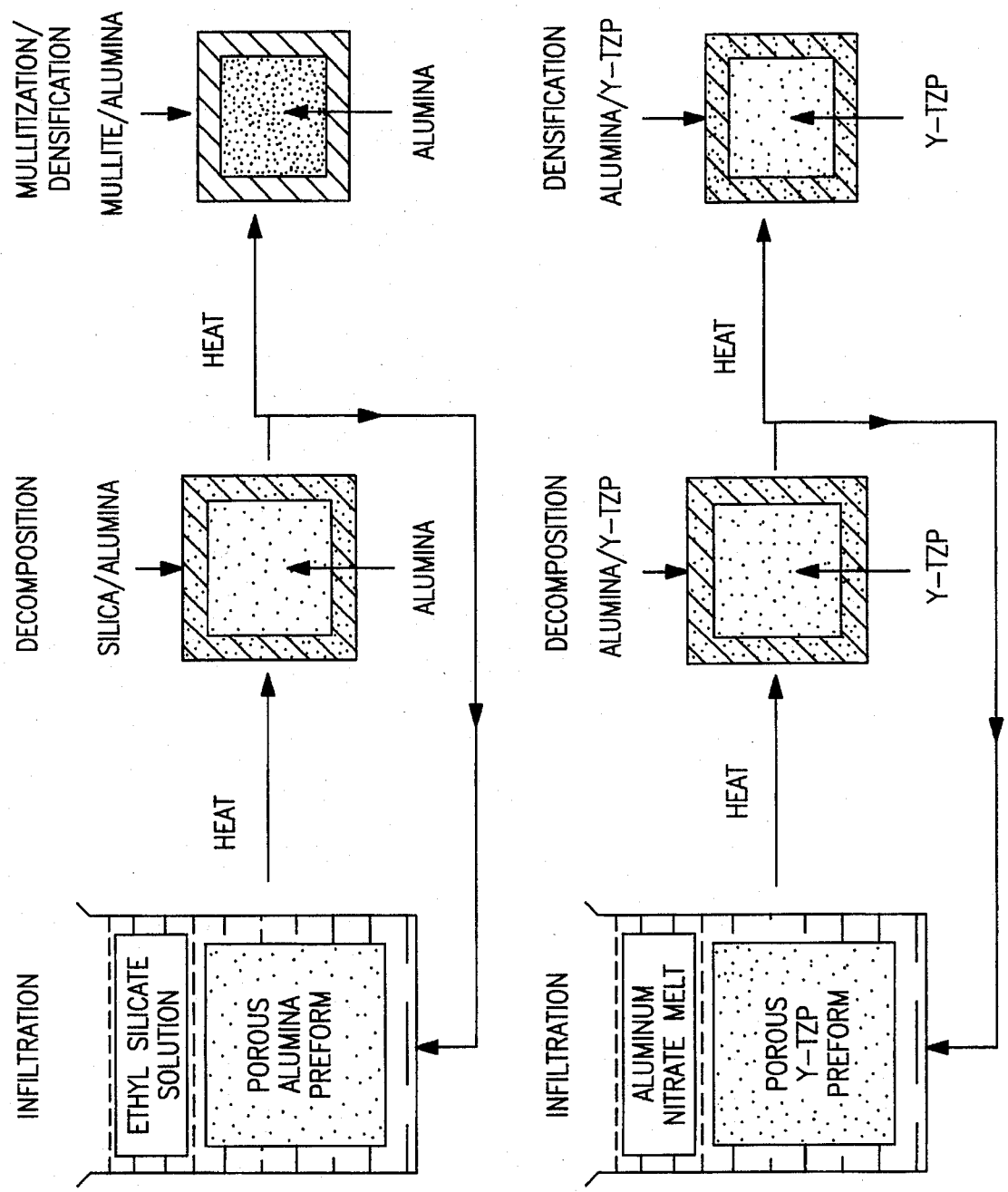

INFILTRATION PROCESS FOR INTRODUCING ADDITIONAL PHASES FOR MULTIPHASE (COMPOSITE) MATERIALS

Composite ceramic materials are of growing industrial interest for various structural applications as they offer the possibility of producing finished materials that optimize the differing properties of the two or more components within the composite. In many instances, these composite materials possess properties that are better than the properties of either of the individual components. Thus, the combination of various ceramic components offers the possibility of tailoring systems for specific applications and at the same time attempting to optimize particular properties of each component important in that application. For example, alumina might be added to zirconia to increase the hardness of the finished material.

Traditionally, the most common technique for tailoring a ceramic system to a specific application has been to utilize wet or dry mixing of powders of each component in the composite. However, in many instances when this physical mixing is done, the powders of each component or phase has been found to segregate or aggregate into their separate phases. Of course, with either segregation or aggregation of the phases, the resultant composite seldom has the improved properties being sought.

In addition to physical mixing of each component, many other methods have been used to fabricate composite systems including co-precipitation, heterocoagulation, and sol-gel techniques. An approach that has heretofore not been used in ceramic systems, prior to the present invention, is the use of infiltration to introduce a particulate phase into the composite body.

The design of the various fabrication techniques varies from system to system and depends, to a great extent, upon the application to which the composite material is to be used. For example, in many particulate and whisker ceramic composites, a uniform distribution of the second phase is desired while in the case of fiber-reinforced materials, a high degree of fiber orientation is often preferred. Thus, the development of new and innovative techniques for fabricating composites is an ongoing process.

In addition to the fabrication techniques for tailoring a ceramic system wherein the components are dispersed throughout the composite body, there are also techniques which have been developed for modifying the surface of a body to produce a component with an overall higher level of performance in a particular application than the unmodified components. In some instances surfaces have been modified in such a way so as to introduce compressive surface stresses in a body to strengthen it. Both the chemical and physical tempering of glass are examples of such techniques to strengthen the surface of glass. Surface modification has also been carried out by diffusing species of one material into dense bodies at high temperature as, for example, the introduction of chromia into alumina. Phase transformation in the surface region can be used to affect the surface properties, and this has been used in zirconia systems. Ion implantation by bombardment of surfaces with ions has also been employed to modify the properties of the surface.

Other techniques have been used for both surface modification as well as for introducing additional phases throughout composite systems. An approach which has heretofore not been used in composite ceramic systems to provide for surface modification has been the infiltration technique of fabrication according to the present invention.

Briefly outlined, the infiltration process according to the present invention consists of infiltrating a porous powder compact with a suitable liquid infiltrant followed by heat treatment to bring about such processes as decomposition, solid-state reaction, and densification depending upon the specific system. The technique provides the option of fabricating composites by fully infiltrating the body or for modifying only the surface region by partial infiltration. In addition, the technique provides the option to conduct multiple sequential infiltrations using the same or differing infiltrant.

For some systems, the use of the process according to the present invention for surface modification provides the opportunity of introducing surface compressive stresses. In this respect an important design consideration is the thermal expansion coefficients of the surface and bulk—the modified surface must have a lower coefficient than that of the bulk. The introduction of a surface compressive stress may be used to strengthen materials, and for some systems incorporating a second phase will also lead to an increase in the toughness and/or hardness. The infiltration technique according to the present invention may be used for both bulk or surface treatment when designing ceramic systems for structural applications.

An indication of the advantages and uses to which the process according to the present invention may be put will become apparent from the following detailed description of the present invention which is to be taken in conjunction with the accompanying examples and drawings in which:

FIG. 1 is a schematic representation of the processing steps according to the present invention for the fabrication of mullite/alumina and alumina/Y-TZP bodies.

In general, as depicted in FIG. 1, there is shown a method for preparing a multiphase ceramic material consisting of infiltrating a porous compact preform with a suitable liquid infiltrant followed by heat treatment to bring about such processes as decomposition, solid state reaction, and densification depending upon the specific system.

As stated previously, in many cases composite materials are tailored for a specific application with an attempt made to optimize particular properties important in that application. Alumina is a particularly important ceramic and represents a very large world market, and any process which could lead to improvements in the mechanical properties, such as the strength and toughness, or which allowed for alumina to be used at increased temperatures would represent a major product advantage.

The introduction of mullite into alumina is attractive for several reasons. Pure alumina bodies have traditionally been used as substrate materials for electronic applications where both a low coefficient of thermal expansion and a low dielectric constant are desirable. The addition of mullite as a means of lowering the coefficient of thermal expansion of alumina has been previously suggested, and the significantly lower dielectric constant of mullite would also provide a decrease in this parameter in a composite substrate. For structural applications, both at room and elevated temperatures, the addition of mullite to alumina bodies could lead to considerable improvement in properties such as thermal shock resistance, enhanced creep resistance in a mullite/alumina composite over monolithic alumina materials.

Thus, the process as depicted in FIG. 1 and discussed in greater detail below, as specific for the fabrication of mullite/alumina or alumina/zirconia composites, represents a new and previously unreported advance in the fabrication of such material. Although the representation depicted is to the formation of two composites, the process may also be utilized in the fabrication of other composite materials. This depiction is merely two examples of the process according to the present invention and is not intended nor should it be considered as limiting the present invention to only these materials.

The infiltration technique of the present invention is a relatively simple process for fabricating composite bodies and overcomes the limitations and disadvantages of the previously used methods by allowing for comparatively broad control over both the depth and composition of the modified zone. Although porous partially sintered powder compacts are described as preforms for composite fabrication, others such as fiber preforms may also be employed.

An advantage to such a system as depicted in FIG. 1 is that since the $Al_2O_3$ required for forming mullite is already present in the preform, only $SiO_2$ which is also required for mullite formation needs to be introduced into the system. Utilizing the $Al_2O_3$ already in the compact will then tend to maximize the amount of the second phase that can be formed. Second, sources of $SiO_2$ exist which are liquid at room temperature, thereby eliminating the need for heating prior to infiltration and the need for removing a solidified surface layer after infiltration.

It has previously been demonstrated that the formation of mullite surface layers on alumina bodies can significantly increase their strength. Techniques that have previously been used to form mullite on dense alumina specimens have included burying a dense alumina specimen in SiC and placing the buried specimen in a 1500° C. furnace, or by using the electron beam heating of high purity Si under vacuum to deposit a film of Si on dense alumina bodies with a subsequent firing step to form mullite. Both of these treatments resulted in substantial increases in the flexural strength of the specimen, although a disadvantage with these methods is that the thickness of the zone that can be modified is relatively small.

The infiltration process according to the present invention has the distinct advantage of introducing additional phases after a component has been formed using well-established techniques. In the case of alumina, bodies formed by pressing, extrusion, tape or slip casting, and injection molding could all be subsequently infiltrated with a suitable infiltrant to provide a finished body with two or more phases.

The driving force for the spontaneous infiltration process according to the present invention is the capillary pressure which normally occurs within the network of pores in the preform. Infiltration may, of course, be enhanced by applying pressure, or a combination of vacuum and pressure, to the infiltrant-coated preform. The control of the various parameters (including pore and powder size, the length of exposure of the preform to the infiltrant, and the degree of any pressure or vacuum applied) allows the infiltration technique of the present invention to be used as a surface modification method or as a means of fabricating multiphase composite bodies—the amount of the second phase which can be formed in composite bodies being determined by the volume and size of the porosity in the preform, the density of the infiltrant, its weight loss on decomposition as well as on any reactions which occur between the infiltrated phase and the preform material.

The steps in the fabrication process according to the present invention illustrated in FIG. 1 with regard to mullite/alumina fabrication involve the immersion of a porous alumina body preform into a suitable infiltrant which serves as the source of silica. It is optional, however preferred, that the green alumina preform be partially sintered by prefiring the preform to about 1200° C. prior to infiltration since failure to do so may lead to cracking during subsequent processing steps. Once immersed, the infiltrant will, as described above, be drawn into the porous body by capillary action. An advantage of this process is that only a silica containing infiltrant needs to be introduced into the porous preform; the subsequent formation of mullite at high temperatures by the reaction of silica with the alumina already in the preform serves to enhance the amount of second phase formed.

Although several ethyl silicate solutions have been studied and shown to be excellent infiltrants, other sources of silica such as methyl silicate solutions are also available and may be substituted in the depicted process.

Following infiltration, the infiltrated preform is heated to (1) decompose the infiltrant from polysilicates to silica, (2) form mullite by the reaction between silica and alumina, and (3) densify the body.

The steps illustrated in FIG. 1 with regard to alumina/Y-TZP fabrication are slightly modified from those depicted with regard to mullite/alumina fabrication, however, they also are encompassed by the process according to the present invention.

Some of the benefits of adding alumina to Y-TZP (yttria-tetragonal zirconia polycrystals) are increased hardness and Young's modulus (since alumina is harder and stiffer than Y-TZP), toughness and strength. The source of the increase of toughness is not clear but may be that the alumina enhances the transformation toughening effect already present in Y-TZP; other possibilities are that the second phase alumina particles cause crack deflection or that the alumina raises the overall toughness of the composite by increasing the grain boundary toughness. Whatever the reason, the improvement of these properties leads to better performance of the composite in its structural applications.

Overall, the two variants of the process according to the present invention are similar. The initial step in both systems is the infiltration of a porous powder preform. In the alumina/Y-TZP system, the infiltration is carried out at about 90° C. with an aluminum nitrate nonahydrate $[Al(NO_3)_3.9H_2O]$ melt. Following removal from the infiltrant, the aluminum nitrate within the preform resolidifies. For the mullite/alumina system, infiltration takes place at room temperature with an ethyl silicate sol which eventually gels within the preform after removal from the infiltrant.

The second step in the process according to the present invention is the decomposition of the infiltrant. Heating the infiltrated Y-TZP preform causes the aluminum nitrate nonahydrate to first remelt, and then decompose to alumina. When the infiltrated alumina preforms are heated, the decomposition of the ethyl silicate gel eventually leads to the formation of silica. At this point, in both systems the infiltration and decomposition steps can be repeated to increase the amount of additional phase in the preform.

The last step in the fabrication process is a final firing of the two phase bodies. Alumina/Y-TZP bodies containing 4–5% (volume) alumina densify to >99.5% of the theoretical density after heating at 1500° C. for 2 hours. During the final firing of the silica-containing alumina preforms, both the formation of mullite and densification occur. The reaction between the silica introduced into the preform during infiltration with the alumina already present, serves to enhance the amount of second phase formed in the sample. Bodies containing up to 20% (volume) mullite have been densifted to >98.5% after heating at 1650° C. for 2 hours.

A key step in the design of a suitable process according to the present invention is the identification and selection of suitable infiltrants for the appropriate fabrication desired. A guide in respect to this selection is the Washburn model of fluid flow in a cylindrical channel which predicts the infiltration depth as a function of various parameters. The Washburn equation:

$$d = (\gamma r t \cos \theta / 2\eta)^{1/2}$$

Based upon this equation, the infiltration depth (d) will be enhanced if the infiltrant possesses a high surface energy ($\gamma$) the contact angle ($\theta$) between the infiltrant and solid is small (preferably 0) and the infiltrant viscosity ($\eta$) is low. The other parameters in the equation are time (t), and the pore radius (r). In theory, the pore radius should be maximally increased while maintaining capillarity. It is also important to consider the pore radius in the preform body since, if colloidal suspensions are being used as the infiltrants and they are too large to enter the pore, the colloidal particles will be trapped at the surface of the preform during infiltration.

In those instances where the infiltrant must undergo decomposition, following infiltration, other factors such as the decomposition temperature must be considered. Decomposition should take place prior to the onset of sintering so as to not interfere with the densification process and should not generate high stresses which could cause preform cracking. To maximize the amount of additional phases incorporated into the body, the density of the infiltrant should be high and the weight loss on decomposition small. The melting temperature of the infiltrant is also important—with infiltrants which are liquid at or near room temperature having an obvious advantage in terms of simplifying the process according to the present invention.

A natural outcome of the infiltration technique according to the present invention is the increase in the pre-sintered density of the preform body. This can lead to lower shrinkages during the final densification step, and this shrinkage can further be decreased if reactions in the system lead to the formation of phases with a higher specific volume.

Many of the infiltrants which may be used in the process according to the present invention may require a hydrolysis reaction prior to infiltration of the preform body. In the case of ethyl silicate, this hydrolysis is brought about by the addition of water in the presence of a mutual solvent such as ethanol. The reaction is further catalyzed by the addition of either an acid or base to the solution. Both the catalyst and the molar ratio of water to silicate help to determine the gelation time in the system with acid catalysis resulting in longer, and base catalysis resulting in shorter, gelation times.

A more complete understanding of the process according to the present invention may be had by reference to the following two general examples and discussions related thereto:

EXAMPLE I

The aim of this experiment is to demonstrate the introduction of aluminum oxide (the alpha phase) into a zirconium oxide body. In order to accomplish this, a liquid precursor, hydrated aluminum nitrate, for aluminum oxide was chosen, although a variety of other inorganic or organic liquid sources of aluminum oxide could be used. On heating, the hydrated aluminum nitrate first melts in its own water to form a liquid, and upon further heating it decomposes releasing gases until it forms solid aluminum oxide. At temperatures above about 1200° C., the oxide is usually in the alpha form. The zirconium oxide used in the experiment was obtained from commercial sources in the form of a reactive powder (zirconium oxide containing 3 mole % yttrium oxide).

A quantity of the zirconium oxide powder was pressed (uniaxial press at 35 MPa, isostatic press at 138 MPa) into a preform shape for use in the experiment. The preform was next fired in a temperature range to allow partial sintering of the zirconium oxide. This step has two important features: it increases the strength of the porous preform so that it can withstand the subsequent processing; and it provides for a control of the void spaces between the powdered particles that will subsequently be filled with the liquid infiltrate. The higher the firing temperature for this firing, the denser the porous body is likely to be; the denser body has less void volume for the fluid infiltrant; and with less infiltrant, the lower the amount of aluminum oxide in the final finished product. This process may involve some optimization if the amount of aluminum oxide is desired to be maximized as this would in turn require a preform which is as porous as possible or the use of multiple infiltrations. If the porosity is too great, the preform may be too weak and may fracture during the subsequent processing steps. In the present experiment, it was found that for the zirconium oxide powder chosen, firing in the range of 700° C. to 1300° C., at a rate of 2° C. per minute and a holding time of 1 or 2 hours, gave porous preforms with densities that ranged from 50 to 90% of the theoretical density of zirconium oxide. Most of the infiltration was performed on preforms that were pre-sintered in the range of 50 to 60% of theoretical density.

For the infiltration of the porous preform, the temperature of the system was held between 80° C. to 90° C. for the nitrate to remain a liquid. The infiltration time was varied as this allows the infiltrant to penetrate to different depths of the preform—in addition to infiltration time, the process may also be controlled by changing the physical properties of the infiltrant such as viscosity, wetting behavior, etc.

After infiltration, the specimens were removed from the liquid and allowed to cool to room temperature. Any nitrate adhering to the preform was carefully removed and the preforms heated to decompose the infiltrant and to bring about densification. This heating was combined in a single firing. The rate of heating was controlled to 5° C. per minute to 600° C. and 2° per minute to the final firing temperature—decomposition of aluminum nitrate in air is near completion by 500° C., and the final firing temperature was chosen to maximize the final density of the composite for the system being tested. Of course, other final temperatures are possible depending upon the infiltrant and porous preform used as well as the degree of densification desired. For the starting materials used, the final material could be produced with <1% (volume) porosity with a firing temperature of 1500° C. for two hours. The maximum temperature can vary substantially for different starting materials, however, it is usually in the range of 1300° C. to 1700° C. for zirconium oxide based ceramics. After the hold time at the maximum temperature, the experimental samples were cooled moderately slowly (about 15° C. per minute).

A prime consideration in producing composite materials is the amount of the additional phases to be added. For the process according to the present invention described in Example I, the amount of aluminum oxide could be varied from 0 to 6% (volume), depending upon the density prior to infiltration and the infiltration time. Using multiple infiltration, this could be raised to about 12% (volume).

Mechanical property measurements have shown the addition of aluminum oxide in the range of 4 to 5% (volume) increased the bend strength from 723 to 837 MPa, the fracture toughness from 4.8 to 5.5. MPa, and the hardness from 12.9 to 13.5 GPa.

EXAMPLE II

The aim of this experiment is to demonstrate the introduction of mullite, a crystalline aluminum silicate phase of composition $3Al_2O_3.2SiO_2$ into an aluminum oxide (alpha phase) preform. In order to accomplish this, a liquid precursor for $SiO_2$ was chosen, ethyl silicate. The aluminum oxide was obtained from commercial sources in the form of a reactive powder.

A quantity of the aluminum oxide powder was pressed (uniaxial press at 28 MPa, isostatic press at 138 MPa) into required size and shape. The shaped preform was fired in a temperature range to allow partial sintering of the aluminum oxide. It was found for the materials chosen for this experiment that a firing of the aluminum oxide preform at 1200° C. gave a porous body with a density that is about 70% of the theoretical density of aluminum oxide, i.e., the body contained 30 (volume) porosity. For other aluminum oxide powders, this presintering step could be done at other temperatures but these would usually be in the range of 800° C. to 1700° C.

The next step in the process is the infiltration of the porous preform. Liquid silica precursors are usually capable of gelation, and this could be used to control infiltrant viscosity—a means to control the degree of infiltration in the preform. These liquids were either hydrolyzed prior to infiltration using a molar ratio of ethyl silicate to water of 1:2 (acid catalysis) or, for ease of processing.

After infiltration, the sample bodies were removed from the liquid and dried (typically for 48 hours at room temperature). The samples were then heated at a rate of 1° C. per minute to 600° C., and 2° C. per minute to 1200° C. The decomposition of ethyl silicate in air is near completion by 400° C. In the final step of the heating schedule, the temperature was increased to the range of 1500° C. to 1700° C., typically at 5° C. per minute. The choice of the final temperature was to maximize the final density of the composite, i.e., so that it contained as little porosity as possible. For the starting materials of this experiment, the final material could be produced with <2% (volume) porosity with a firing temperature of 1600° C. (for about 12 hours), or 1650° C. (for about 2 hours). The maximum temperature could vary substantially for different starting materials, however, it is usually in the range of 1300° C. to 1700° C. for aluminum oxide based ceramics. After holding at the maximum temperature for the necessary time, the samples were cooled relatively slowly (about 5° C. per minute).

A prime consideration in producing composite materials is the amount of the additional phases that are added and the resulting changes in the microscopic structure. For the process described in Example II, the amount of mullite could be varied from 0% to about 15% (volume), depending upon the density of the preform prior to infiltration and the infiltration time. Multiple infiltration has shown the amount of mullite could be increased to about 30% (volume).

The addition of mullite according to the present invention has been found to have several benefits. For example, the presence of the mullite limited the crystal growth of the aluminum oxide (large crystals of aluminum oxide often may cause failure defects). The amount of mullite phase was often found to decrease with increasing distance into the material, that is the microstructure of the material was graded from the surface into the interior of the body. This, in turn, allowed the size of the aluminum oxide crystals to vary, indeed materials were produced where the aluminum oxide had small crystals (1 to 10 μm) at the surface while internally the size could be >100 μm. The additional mullite at the surface is expected to be beneficial in that the lower thermal expansion of the mullite will place the surface in residual compression as it cools from the final densification temperature—fracture in ceramics is usually controlled by the presence of tensile stresses, and residual compression reduces the overall magnitude of any applied tensile stresses. Other processing conditions could allow a more uniform distribution of the mullite or limit the mullite only to the surface region. Thus, it appears that this infiltration processing gives rise to unique microstructures.

Mechanical property measurement has shown the addition of the mullite in the range of 13% to 20% (volume) increased the bend strength from 355 to 555 MPa, and the fracture toughness from 3.9 to 6.4 MPa.

For the composites made in accordance with the present invention described above, the present invention represents a simple step in the manufacturing process which could easily be incorporated into traditional ceramic processing technology.

Thus while we have illustrated and described the preferred embodiment of our invention, it is to be understood that this invention is capable of variation and modification, and we therefore do not wish or intend to be limited to the precise terms set forth, but desire and intend to avail ourself of such changes and alterations which may be made for adapting the invention of the present invention to various usages and conditions. Accordingly, such changes and alterations are properly intended to be within the full range of equivalents and therefore within the purview of the following claims. The terms and expressions which have been employed in the foregoing specification are used therein as terms of description and not of limitation, and thus there is no intention in the use of such terms and expressions of excluding equivalents of features shown and described or portions thereof, it being recognized that the scope of the invention is defined and limited only by the claims which follow.

Having thus described our invention and the manner and process of making and using it in such full, clear, concise, and exact terms so as to enable any person skilled in the art to which it pertains, or to with which it is most nearly connected, to make and use the same:

We claim:

1. A process for introducing additional phases for composite materials which comprises:

providing a first porous body of material;

heating said first body to a temperature sufficient to cause partial sintering of said body;

exposing said partial sintered body to a liquid infiltrant at a temperature sufficient to maintain said infiltrant in a liquid state and for a sufficient time to allow said liquid to infiltrate the pores of said sintered body;

heating said exposed body to a first decomposition temperature for said infiltrant for a sufficient time to allow the infiltrant to decompose to said desired phase; and heating said body to a densification temperature sufficient to cause densification of said body.

2. A method for introducing additional phases for composite materials which comprises:

providing a first porous body of material;

heating said first body to a temperature sufficient to cause partial sintering of said body;

providing a precursor to the desired phase as a liquid infiltrant;

exposing said partial sintered body to said infiltrant at a temperature sufficient to maintain said infiltrant in a liquid state and for a sufficient time to allow said liquid to infiltrate the pores of said sintered body;

heating said exposed body to a first decomposition temperature for said infiltrant for a sufficient time to allow the infiltrant to decompose to said desired phase; and heating said body to a densification temperature sufficient to cause densification of said body.

3. A method according to claim 2 which comprises providing a first body of yttria-stabilized tetragonal zirconia polycrystal, and heating to a partial sintering temperature of from about 700° to about 1300° C.

4. A method according to claim 1 wherein exposing said partial sintered body to the liquid infiltrant is by immersion.

5. A method according to claim 2 wherein exposing said partial sintered body to the liquid infiltrant is by immersion.

6. A method according to claim 2 which comprises providing a first body of alumina, and heating said first body to a partial sintering temperature of about 1200° C.

7. A method according to claim 6 which comprises providing a silicate precursor.

8. A method according to claim 7 which comprises providing an alkyl silicate precursor.

9. A method according to claim 7 which comprises heating to a densification temperature of about 1650° C.

10. A method according to claim 3 which comprises providing an aluminum nitrate nonahydrate melt precursor.

11. A method according to claim 10 which comprises heating to a densification temperature of about 1500° C.

12. A method for introducing aluminum oxide into a preformed porous zirconium oxide body which comprises:

providing a preform-shaped porous body of zirconium oxide powder;

heating said body to a temperature sufficient to cause partial sintering of said body;

providing a liquid infiltrant of aluminum nonahydrate as a precursor of aluminum oxide to said body at a temperature sufficient to maintain said infiltrant in the liquid state and for a time sufficient to allow said liquid to infiltrate the pores of said sintered body;

heating said infiltrated body to a decomposition temperature for said infiltrant for a sufficient time to allow the infiltrant to decompose to said desired phase; and heating said body to a densification temperature sufficient to cause densification of said body.

13. A method according to claim 12 which comprises heating said body to a partial sintering temperature of from about 700° C. to about 1300° C.

14. A method according to claim 12 which comprises heating said body to a decomposition temperature of from about 500° C. to about 600° C.

15. A method according to claim 12 which comprises heating said body to a densification temperature of from about 1300° C. to about 1700° C.

16. A method for introducing mullite into a preformed porous aluminum oxide body which comprises:

providing a preform-shaped porous body of aluminum oxide powder;

heating said body to a temperature sufficient to cause partial sintering of said body;

providing a liquid infiltrant of ethyl silicate as a precursor to said mullite to said body at a temperature sufficient to maintain said infiltrant in the liquid state and for a time sufficient to allow said liquid to infiltrate the pores of said sintered body;

heating said infiltrated body to a decomposition temperature for said infiltrant for a sufficient time to allow the infiltrant to decompose to said desired phase; and heating said body to a densification temperature sufficient to cause densification of said body.

17. A method according to claim 16 which comprises heating said body to a partial sintering temperature of from about 800° C. to about 1700° C.

18. A method according to claim 16 which comprises heating said body to a decomposition temperature of from about 400° C. to about 1200° C.

19. A method according to claim 16 which comprises heating said body to a densification temperature of from about 1300° C. to about 1700° C.

* * * * *